United States Patent [19]

Malhotra

[11] Patent Number: 4,654,406

[45] Date of Patent: Mar. 31, 1987

[54] PREPARATION OF TETRAFLUOROETHYLENE FINE POWDER

[75] Inventor: Satish C. Malhotra, Parkersburg, W. Va.

[73] Assignee: E. I. Du Pont de Nemours and Company, Wilmington, Del.

[21] Appl. No.: 774,002

[22] Filed: Sep. 9, 1985

[51] Int. Cl.$^4$ .............................................. C08F 2/26
[52] U.S. Cl. ........................................ 526/91; 526/81
[58] Field of Search ................ 526/81, 86, 216, 221, 526/255, 91

[56] References Cited

U.S. PATENT DOCUMENTS

| | | | |
|---|---|---|---|
| 2,388,373 | 11/1945 | Stewart | 526/216 |
| 2,594,560 | 4/1952 | Howard | 260/80 |
| 2,938,889 | 5/1960 | Krespan | 260/87.5 |
| 3,032,543 | 5/1962 | Bro et al. | 260/92.1 |

Primary Examiner—Paul R. Michl

[57] ABSTRACT

Ce(IV) salts and oxalic acid form a redox initiator system for polymerizing tetrafluoroethylene.

3 Claims, No Drawings

PREPARATION OF TETRAFLUOROETHYLENE FINE POWDER

FIELD OF THE INVENTION

This invention relates to a process for preparing tetrafluoroethylene (TFE) fine powder resins that have good stretch performance.

BACKGROUND OF THE INVENTION

Tetrafluoroethylene (TFE) fine powder resins are non-melt-fabricable and are commonly processed by paste extrusion wherein the powder is mixed with a lubricant and is then discharged through a paste extruder to obtain films, tubes, tapes, protective coating on wire and the like.

Such paste extruded films, tubes and tapes can be rapidly stretched in unsintered form to form a strong material that is porous to water vapor but not to liquid water. Such a material is useful in providing "breathable" fabric material for garments, tenting, separatory membranes and the like. Many resins useful in making such paste extruded stretched films exhibit a sensitivity to lubricant loading levels and to stretch rates that necessitate careful control over the loading level used in order to ensure a good stretched product.

It is desirable to improve on these known resins by providing improved TFE fine powder resins that are not as sensitive to lubricant loading levels and which have improved stretchability. This invention is directed to preparation of such resins by using an initiator system not herefore used for this purpose.

SUMMARY OF THE INVENTION

This invention provides a process for preparing tetrafluoroethylene resins by polymerizing tetrafluoroethylene, and, optionally, a small amount of at least one copolymerizable fluorinated ethylenically unsaturated comonomer, in an aqueous medium in the presence of a substantially non-telogenic anionic surfactant present in an amount which maintains colloidal particles of polymerization product in dispersed form, said process being carried out by contacting tetrafluoroethylene and, optionally, said comonomer, in the presence of at least one polymerization initiator consisting of a Ce(IV) salt/oxalic acid redox couple, and wherein both the ceric salt and oxalic acid are added as precharge or, either the ceric salt or the oxalic acid is added as precharge and the other added intermittently or continuously during the polymerization and where the last addition occurs before the end point so that the reaction slows down and the end point is at least 7%, preferably 20%, longer in terms of time in comparison with a reaction which does not slow down.

This process produces an aqueous dispersion of the resins made by the process. These dispersions are themselves useful for coating metals and fabrics. On coagulation, the resins are obtained.

The resins have an unusual insensitivity to lubricant loading levels, have high stress relaxation times (dwell times), and can be stretched at low stretch rates to make porous articles.

DESCRIPTION OF THE INVENTION

The polytetrafluoroethylene resins made by the process of this invention are referred to by those skilled in the art as tetrafluoroethylene fine powder resins. The term "fine powder" has attained a special meaning in the art. It means that the resin has been prepared by the "aqueous dispersion polymerization" process. In this process sufficient dispersing agent is employed and agitation is mild in order to produce small colloidal size particles dispersed in the aqueous reaction medium. Precipitation (i.e., coagulation) of the resin particles is avoided during the polymerization.

There is another polytetrafluoroethylene material called "granular polytetrafluoroethylene resin" which is prepared by polymerizing tetrafluoroethylene by a process in which little or no dispersing agent is employed and agitation is carried out vigorously in order to produce a precipitated resin. This process is called "suspension polymerization".

The two polymerization procedures produce distinctly different products. The "granular" product can be molded in various forms, whereas the product produced by the aqueous dispersion method cannot be molded but must be fabricated by dispersion coating or by coagulating to obtain fine powder and then adding a lubricant to the powder for paste extrusion. In contrast, granular resin is incapable of being paste extruded.

Tetrafluoroethylene may be polymerized alone in the process of this invention to obtain a fine powder homopolymer resin. In addition, tetrafluoroethylene may be copolymerized with copolymerizable fluorinated ethylenically unsaturated comonomer provided the amount of comonomer is not sufficient to cause the resulting polymer to become melt-fabricable or to change the characteristics of the resins.

Representative copolymerizable fluorinated ethylenically unsaturated comonomers are represented by the formulas

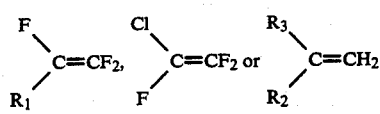

wherein $R_1$ is $-R_f$, $-R_f-X$, $-O-R_f$ or $-O-R_f-X$ in which $-R_f$ is a perfluoroalkyl radical of 1–10 carbon atoms, $-R_f-$ is a linear perfluoroalkylene diradical of 1–10 carbon atoms in which the attaching valences are at each end of the linear chain, and X is H or Cl; $R_2$ is F, $-R_f$ or $-R_f-X$; and $R_3$ is H or F. A dioxole may also be employed, of the formula

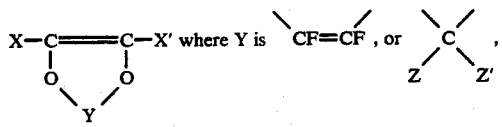

and X and X' are F or Cl and Z and Z' are each alkyl or fluorinated alkyl of 1–6 carbons.

Representative copolymerizable fluorinated ethylenically unsaturated comonomers include hexafluoropropylene, perfluorohexene-1, perfluorononene-1, perfluoro(methyl vinyl ether), perfluoro(n-propyl vinyl ether), perfluoro(n-heptyl vinyl ether), (perfluoromethyl) ethylene, (perfluorobutyl) ethylene, ω-hydroperfluoropentene-1, 3-hydroperfluoro(propyl vinyl ether), and the like, or mixtures thereof such as a mixture of hexafluoropropylene and perfluoro(propyl vinyl ether). Preferably the comonomers are selected from perfluoro(alkyl vinyl ethers) of the formula $R_f$—O—CF=CF$_2$; or perfluoro(terminally unsaturated olefins) of the formula $R_f$—CF=CF$_2$; or (perfluoroalkyl) ethylenes of the formula $R_f$—CH=CH$_2$, wherein $R_f$ is perfluoroalkyl of 1–10 carbon atoms.

By the term "non-melt-fabricable" is meant a tetrafluoroethylene polymer whose melt viscosity is so high that the polymer cannot be easily processed by melt fabrication techniques. Generally the higher the molecular weight of the polymer, the higher the melt viscosity. A melt viscosity above which tetrafluoroethylene polymers are non-melt-fabricable is $1 \times 10^9$ poises. The melt viscosities of non-melt-fabricable polymers are so high that molecular weights are usually measured indirectly by a procedure which gives the standard specific gravity (SSG) of the resin. The SSG of the resin varies inversely with molecular weight; as the molecular weight increases, the numerical value of the SSG decreases.

The resins produced herein, in general, are characterized in that:

(a) The primary particle size is between 0.15 and 0.5 microns, (b) the specific surface area is greater than 5 m$^2$/g, (c) the standard specific gravity is less than 2.190, (d) the rheometric pressure (sometimes referred to as extrusion pressure) is at least 250 kg/cm$^2$, at reduction ratio of 400:1.

(e) the uniformity of stretch is at least 75% throughout a lubricant loading range of 4 weight percent which 4 weight percent range is within a lubricant loading level range between 12 and 21 weight percent at a stretch rate of 100%/second.

(f) The uniformity of stretch is at least 75% throughout a stretch rate of between 10 and 100%/second at a lubricant loading level of 17%.

(g) the stress relaxation time is at least 400 seconds measured at 393° C.

In a preferred embodiment, the uniformity of stretch is at least 75% throughout a lubricant loading range of between 17 and 20 wt. % at a stretch rate of 100%/second; and also is at least 75% throughout a stretch rate of between 22% and 100%/second at a lubricant loading of 17 wt. %.

In the process of this invention, tetrafluoroethylene monomer, optionally along with ethylenically unsaturated comonomer, is admixed or contacted with an aqueous medium containing dispersing agent and polymerization initiator. The polymerization temperature and pressure are not critical provided the reaction profile recited above is used. Ideally the temperature will be between 50°–85° C. A practical, but noncritical, pressure can be between 25–40 kg/cm$^2$. The polymerization is ordinarily carried out in a gently stirred autoclave.

The dispersing agents used are anionic, substantially nontelogenic dispersing agents. Commonly employed dispersing agents are fluorinated carboxylates containing 7–20 carbon atoms, such as ammonium polyfluorocarboxylates. The amount of dispersing agent present will be sufficient to stabilize the colloidal dispersion. It may be ordinarily between about 1000 ppm and about 5000 ppm based on weight of water employed in the aqueous dispersion. The dispersing agent may be added prior to initiation of polymerization or may be added in increments as described in Punderson U.S. Pat. No. 3,391,099.

If desired, a paraffin wax (i.e., a saturated hydrocarbon having more than 12 carbon atoms) that is liquid at the polymerization temperature may be employed as described in Bankoff U.S. Pat. No. 2,612,484. Usually, the wax is employed in an amount between 0.1%–12% by weight of water in the aqueous dispersion.

Polymerization is effected by mixing the foregoing described ingredients under the conditions specified above. Mixing is ordinarily carried out by mildly agitating the aqueous polymerization mixture. Agitation is controlled to aid in preventing premature coagulation of resin particles produced in the polymerization. Polymerization is ordinarily conducted until the solids level (i.e., polymer content) of the aqueous mixture is between about 15 and 60 percent by weight of the mixture.

By the term "substantially non-telogenic" used in the definition of the dispersing agent is meant that the polymer produced has an SSG (standard specific gravity) no more than 0.020 higher than that of a polymer produced using ammonium perfluorooctanoate as the dispersing agent. SSG is a means of measuring the molecular weight of the polymer produced. The higher the SSG, the lower the mol wt.

The initiator is a Ce(IV) salt/oxalic acid redox couple. The Ce(IV) salt can be denoted as $$CE(IV) \frac{X_4}{n}$$

where X is an anion, such as sulfate, nitrate, etc., and n is the valence of the anion. Both the ceric salt and oxalic acid are added as precharge, or either the ceric salt or the oxalic acid is added as precharge and the other added intermittently or continuously during the polymerization. Alternatively, both of the reagents are added intermittently or continuously. The last addition of either one occurs so that the reaction slows down and the end point is at least 7%, preferably 20%, longer in comparison with a reaction which does not slow down.

The initiator amount added to the polykettle may vary depending on the molecular weight of the product desired. Generally, this amount will be 2–300 ppm (preferably 5–100 ppm) of ceric ammonium nitrate and 15–400 ppm (preferably 50–200 ppm) of oxalic acid, based on aqueous charge.

The reaction is generally carried out in acidic medium. Succinic acid is a preferred common acid, as it also retards coagulation. Optionally, hydrochloric acid may also be added in an amount 25–100 ppm of the reagent grade, based on aqueous charge.

On completion of polymerization, the dispersed polymer particles can be coagulated by high speed agitation of the aqueous layer. The particles can then be collected and dried.

Non-melt fabricable tetrafluoroethylene fine powder resins produced by the process of this invention exhibit excellent stretch performance at elevated temperatures, e.g. 300° C., even at stretch rates below 100% per second, to result in a stretched material that is strong and breathable but impervious to liquid water. The resins are of high molecular weight, having an SSG of less than 2.190. They have a high rheometer pressure which is at least 250 kg/cm$^2$. They have a primary particle size between 0.15 and 0.5 micron. By "primary" is meant the size of the colloidal resin particles measured prior to coagulation. The resins also have a specific surface area greater than 5 m$^2$/g.

In addition, the resins produced by the process of this invention have several unusual stretch features. First, the resins can be paste extruded over a wide range of amount of lubricant additive present. Normally fine powder resins are sensitive to the amount of lubricant present during paste extrusion and as the amount is varied, the properties of the paste extruded product will vary widely. Uniquely, with the resins of this invention, the amount of lubricant can vary widely, e.g. from at least over a loading range of 4% within a total range of 12 wt % to 21 wt %, with no significant loss of stretch uniformity and smoothness of surface at a stretch rate of 100%/second. This is an insensitivity to organic lubricant loading levels that is not ordinarily seen in other fine powder resins. Suitable organic lubricants include hexane, heptane, naphtha, toluene, xylene, and kerosene products such as Isopar K and E. In general these lubricants will have a viscosity of at least 0.3 centipoise at 25° C. and will be liquid under extrusion conditions. Preferably they will contain paraffins, naphthenes and aromatics and small amounts of olefin.

In addition, the resins exhibit an unusual insensitivity to stretch rate. Most fine powder resins exhibit varying stretch performance properties as stretch rates are varied. But surprisingly when the stretch rate of a resin of this invention was varied between 10% per second and 100% per second, the stretched product exhibited no significant change in stretch uniformity or surface smoothness at a lubricant loading level of 17 wt %. Specifically, the uniformity of stretch was at least 75%. This means that an ink mark made at the center of a paste extruded beading before stretching did not move more than 25% from the center of the stretched product.

In addition, the stress relaxation times of the resins are significantly greater than for most other fine powder resins.

The resins are useful in any of the paste extrusion applications that known tetrafluoroethylene fine powder resins are useful.

TEST PROCEDURES

(1) Raw Dispersion (Primary) Particle Size (Avg)

RDPS was determined from the absorbance (scattering) of a dilute aqueous sample at 546 millimicrons using a Beckman DU spectrophotometer and is based on the principle that the turbidity of the dispersion increases with increasing particle size, as shown in U.S. Pat. No. 4,036,802.

(2) Standard Specific Gravity (SSG)

SSG was measured by water displacement of a standard molded test specimen in accordance with ASTM D1457-69. The standard molded part was formed by preforming 12.0 g of the powder in a 2.86 cm diameter die at a pressure of 352 kg/cm$^2$, followed by the sintering cycle of the preform of heating from 300° C. to 380° C. at 2° C./min, holding at 380° C. for 30 min, cooling to 295° C. at 1° C./min and holding at this temperature for 25 minutes, after which the specimen is cooled to 23° C. and tested for specific gravity.

(3) Rheometer Pressure

Rheometer pressure was measured in accordance with ASTM D1457-81A, section 12.8, except that the resin was not sieved before mixing with the kerosene lubricant and the preform was made in a 26 mm diameter extension tube at 300 psi.

(4) Specific Surface Area (SSA)

SSA was measured by a "Flowsorb" surface area analyzer, Model 2300, sold by Micromeritics Corp. It works on the principle that the quantity of gas (N$_2$) adsorbed on the surface of a sample is directly proportional to its surface area.

(5) Stretch Test a. Preparation of test specimen

A sample of the resin was screened through a 2000 microns sieve. One hundred grams of this resin was admixed with the desired amount of Isopar K lubricant at room temperature by shaking in a glass jar of 6 cm inside diameter and rolling for 4 min. at 64 rpm. It was then preformed at room temperature in a tube 26 mm diameter × 23 cm long at 400 psi. The preform was then paste extruded at room temperature through an orifice 2.4 mm in diameter into a uniform beading. Land length of the orifice was 5 mm. The extrusion speed was 84 cm/min. The angle of die was 30°. The beading was dried at 190° C. for 20 minutes.

b. Stretch Test

A beading of resin was cut and clamped at each end leaving a space of 50 mm between clamps, and heated to 300° C. in a circulating air oven. The clamps were then moved apart at the desired rate to the desired length. The stretched specimen was examined for uniformity of stretch, even appearance and surface roughness. The % uniformity was calculated as follows:

$$\% \text{ uniformity of stretch} = 100 \times \frac{\text{smaller distance from ink mark to beading edge after stretch}}{\frac{1}{2} \text{ total length after stretch}}$$

(6) Stress Relaxation Time

The specimen for the relaxation time measurement was made by stretching a beading, as in Stretch Test, at 1000% per second and 2400% total stretch. Stress relaxation time is the time it takes for this specimen to break when heated at 393° C. in the extended condition. For a short period of time when the specimen is placed into the oven, the temperature drops somewhat, e.g., to 375° C. and it takes about one minute for the oven to return to 393° C. Stress relaxation time is the time starting from placement of the test specimen into the oven.

EXAMPLES

Example 1

A 36-liter polykettle was charged with 19.5 kg of demineralized water, 600 g paraffin wax, 13 g ammonium perfluorooctanoate (C-8) dispersing agent, 10 g succinic acid, 0.50 g ceric ammonium nitrate, Ce (NH$_4$)$_2$(NO$_3$)$_6$, and 2 ml reagent grade hydrochloric acid. The contents of the polykettle were heated to 70° C., evacuated of air, and TFE purged. The contents of the polykettle were agitated at 46 RPM. Tetrafluoroethylene (TFE) was then added to the polykettle until the pressure was 2.75 × 10$^6$ Pa. Oxalic acid solution (16 g/l) was added at 50 ml/min for 5 minutes (4 g). After the polymerization began, as evidenced by a drop in pressure, TFE was added to maintain the pressure at about 2.75 × 10$^6$ Pa. After 0.9 kg TFE had reacted, a solution of 45 g C-8 in 1000 ml water was pumped in at 50 ml/min. After about 3 kg TFE had reacted, the reaction began to slow down. After 10.6 kg TFE had reacted, the feed was stopped and the polykettle was vented, evacuated, and purged with $N_2$. The reaction was 173% longer than if the reaction had not slowed down. The contents of the polykettle were cooled and discharged. The supernatant wax was removed. The dispersion was diluted to 15% solids and coagulated in the presence of ammonium carbonate under high agitation conditions. The coagulated fine powder was separated and dried at 150°–160° C. for three days.

The polymer properties are given in Tables 1 and 2. The total reaction time from TFE pressure up to feed off was 177 minutes. The polymer had excellent stretch properties.

Example 2

Example 1 was repeated, except that:
2.5 g succinic acid was used
1.25 g ceric ammonium nitrate was precharged
1 ml Reagent grade hydrochloric acid was used
oxalic acid solution (4.0 g/l) was added at 7 ml/min until 3.2 kg TFE had reacted. The total oxalic acid added was 1.2 g. No oxalic acid was added after 35% of the TFE had been polymerized
a total of 9.2 kg TFE was reacted
The reaction was 38% longer than if the reaction had not slowed down.

The polymer properties are given in Tables 1 and 2. The total reaction time was 149 min. The polymer had excellent stretch properties.

Example 3

Example 1 was repeated, except that:
5g succinic acid was used
ceric ammonium nitrate was not precharged
1.5 g oxalic acid was precharged
after TFE pressure up, ceric ammonium nitrate solution (4.0 g/l) was added at 10 ml/min until the start of the polymerization. The total ceric salt added was 0.24 g
a total of 11.8 kg TFE was reacted
The reaction was 48% longer than if the reaction had not slowed down. The polymerization rate for the final 30 minutes of polymerization was 159 g/l hr.

The polymer properties are given in Tables 1 and 2. The total reaction time was 144 minutes. The polymer had excellent stretch properties.

Comparison Run A

Example 3 was repeated, except that:
2.5 g succinic acid was used
the ceric salt solution was added until 2.7 kg TFE had reacted. The total ceric salt added was 1.0 g. No ceric salt was added after 19% of the TFE had reacted.
a total of 14.1 kg TFE was reacted
The reaction did not slow down because the ceric salt was added for too long a time. The polymer properties are given in Tables 1 and 2. The total reaction time was 70 minutes. The stretch specimen broke during stretching.

This Example shows that if the reaction does not slow down, the resin has poor stretch characteristics.

Comparison Run B

Example 3 was repeated, except that:
after pressure up, ceric ammonium nitrate solution (1.0 g/l) was added at 5 ml/min until the end of the polymerization. The total ceric salt added was 0.89 g. The polymer properties are given in Tables 1 and 2.

The total reaction time was 177 minutes. The polymer had poor stretch properties in spite of the uniformly slow reaction rate throughout the polymerization. The polymerization rate for the final 30 minutes of polymerization was 380 g/l hour. This Example shows that if the reaction does not slow down before the end of the polymerization, the resin has poor stretch characteristics.

Comparison Run C

The polykettle described in Example 1 was charged with 20 kg demineralized water, 600 g paraffin wax, 13 g C-8 dispersant, and 10 g succinic acid. After a tetrafluoroethylene pressure of $2.75 \times 10^6$ Pa was obtained, 120 ml ammonium persulfate solution (1.0 g/l) was added at 100 ml/min, at 75° C. After 0.9 kg tetrafluoroethylene had reacted, a solution of 45 g additional C-8 in 1000 ml water was added at 50 ml/min. The temperature was maintained at 75° C. After 14.1 kg tetrafluoroethylene had reacted, the feed was stopped and the polykettle was allowed to react down to $1.72 \times 10^6$ Pa before venting. Fine powder was obtained after processing as in Example 1.

The polymer properties are given in Tables 1 and 2. The total reaction time was 123 min. The stretch performance was sensitive to the lubricant level and stretch rate.

This Example shows that with the use of a commonly used initiator, such as ammonium persulfate, the resin performance deteriorates at higher lubricant level and lower stretch rate.

Example 4

Example 1 was repeated, except that:
1 ml (perfluorobutyl) ethylene was also precharged to the polykettle after the final evacuation. The reaction was 288% longer than if the reaction had not slowed down.

The polymer properties are given in Tables 1 and 2. The total reaction time was 264 minutes. The polymer had excellent stretch properties.

Example 5

Example 3 was repeated, except that:
20.5 kg of demineralized water was used
10 g succinic acid was used
1.0 g oxalic acid was used as precharge
polymerization temperature was 72° C.
57 g C-8 in 2000 ml aqueous solution was added during the polymerization at 20 ml/min
120 ml of ceric ammonium nitrate solution (1.0 g/l) was added after TFE pressure-up at 100 ml/min.
Total amount of the ceric salt added was 0.12 g
total TFE polymerized was 7.0 kg
The reaction was 165% longer than if the reaction had not slowed down.

The polymer properties are given in Tables 1 and 2. Total reaction time was 184 minutes. The stretch performance of the polymer was excellent.

TABLE I

|  | Ex. 1 | Ex. 2 | Ex. 3 | Ex. 4 | Ex. 5 | Comparison Runs A | B | C |
|---|---|---|---|---|---|---|---|---|
| RDPS, micron | 0.277 | 0.263 | 0.285 | 0.257 | 0.229 | 0.255 | 0.312 | 0.252 |
| SSG | 2.156 | 2.159 | 2.153 | 2.142 | 2.159 | 2.178 | 2.160 | 2.166 |
| Specific Surface Area, $m^2/g$ | 6.6 | 6.8 | 6.2 | 6.8 | 6.3 | 6.9 | 6.4 | 7.1 |
| Rheometer Pressure, $kg/cm^2$ (400:1) | 480 | 452 | 452 | 441 | 485 | 313 | 333 | 390 |
| Stress Relaxation Time (seconds) | 660 | 540 | 630 | 675 | 615 | 270 | 495 | 555 |

TABLE II

In the Table, the numbers show the percent uniformity of stretch at the conditions described and the letter indicates surface smoothness at the conditions shown.

|  | Ex. 1 | Ex. 2 | Ex. 3 | Ex. 4 | Ex. 5 | Comparison Runs A | B | C |
|---|---|---|---|---|---|---|---|---|
| Uniformity of stretch at lubricant loading of 17% and stretch rate of 22% per second (1) | 87A | 86A | 95A | 85A | 77A | D | D | 78B |
| Uniformity of stretch at lubricant loading of 20% and stretch rate of 100% per second (2) | 94A | 98A | 86A | 91A | 94A | D | D | 66C |
| Uniformity of stretch at lubricant loading of 17% and stretch rate of 100% per second (2) | 88A | 97A | 94A | 98A | 93A | D | 86C | 97A |
| Uniformity of stretch at lubricant loading of 17% and stretch rate of 12% per second (2) | 88A | 89B | 75B | 94A | 83B | D | D | D |
| Uniformity of stretch at lubricant loading of 13.6% and stretch rate of 100% per second (2) | 92A | 85A | 88A | 88A | 81A | D | D | 80B |

(1) 1000% total stretch
(2) 1500% total stretch

I claim:

1. A process for preparing tetrafluoroethylene resins by polymerizing tetrafluoroethylene in an aqueous medium in the presence of a substantially non-telogenic anionic surfactant present in an amount which maintains colloidal particles of polymerization product in dispersed form, said process being carried out by contacting tetrafluoroethylene in the presence of at least one polymerization initiator consisting of a Ce(IV) salt/oxalic acid redox couple, wherein either or both the ceric salt or the oxalic acid are added intermittently or continuously during the polymerization and where the last addition occurs before the end point so that the reaction slows down and the end point is at least 7% longer in terms of time in comparison with a reaction in which addition is continued to the end point.

2. The process of claim 1 where no comonomer is present.

3. The process of claim 1 where a small amount of at least one copolymerizable fluorinated ethylenically unsaturated comonomer is present.

* * * * *